United States Patent
Deuber (10) Patent No.: US 10,004,352 B2
(45) Date of Patent: Jun. 26, 2018

(54) DEVICE FOR DISCHARGING AN EXTRACTION PRODUCT OUT OF A PORTION PACKAGING; PUNCTURING DEVICE AND EXTRACTION APPARATUS

(75) Inventor: Louis Deuber, Richterswil (CH)

(73) Assignee: QBO COFFEE GMBH, Wallisellen (CH)

(*) Notice: Subject to any disclaimer, the term of this patent is extended or adjusted under 35 U.S.C. 154(b) by 627 days.

(21) Appl. No.: 13/263,778

(22) PCT Filed: Apr. 13, 2010

(86) PCT No.: PCT/CH2010/000098
§ 371 (c)(1),
(2), (4) Date: Dec. 29, 2011

(87) PCT Pub. No.: WO2010/118544
PCT Pub. Date: Oct. 21, 2010

(65) Prior Publication Data
US 2012/0090473 A1    Apr. 19, 2012

(30) Foreign Application Priority Data

Apr. 15, 2009  (EP) .................... 09405066

(51) Int. Cl.
*A47J 31/36*    (2006.01)
(52) U.S. Cl.
CPC .................. *A47J 31/3695* (2013.01)
(58) Field of Classification Search
CPC ...... A47J 31/42; A47J 31/605; A47J 31/0573; A23L 1/2111; A23F 5/262; A23F 5/14; B65D 85/8043

USPC .................. 99/286, 289 R, 295, 302 R, 307
See application file for complete search history.

(56) References Cited

U.S. PATENT DOCUMENTS

| | | | |
|---|---|---|---|
| 2,048,350 A * | 7/1936 | McLean | 210/238 |
| 2,899,886 A * | 8/1959 | Rodth | 99/295 |
| 2,939,381 A * | 6/1960 | McBride | 99/295 |
| 2,952,202 A * | 9/1960 | Renner et al. | 99/289 R |
| 3,088,826 A * | 5/1963 | Renner et al. | 426/394 |
| 3,403,617 A * | 10/1968 | Lampe | 99/295 |
| 3,408,921 A * | 11/1968 | Freese | 99/295 |
| 5,840,189 A * | 11/1998 | Sylvan et al. | 210/474 |
| 5,897,899 A | 4/1999 | Fond | |
| 6,763,759 B2 * | 7/2004 | Denisart | 99/302 P |
| 7,028,604 B2 * | 4/2006 | Cortese | 99/295 |
| 7,531,198 B2 * | 5/2009 | Cortese | 426/433 |

(Continued)

FOREIGN PATENT DOCUMENTS

| | | |
|---|---|---|
| EP | 0521188 | 1/1993 |
| WO | 9525457 | 9/1995 |

(Continued)

*Primary Examiner* — David Angwin
*Assistant Examiner* — Jimmy Chou
(74) *Attorney, Agent, or Firm* — Rankin, Hill & Clark LLP (57) ABSTRACT

A discharge device is provided including a supporting surface to rest against a surface region of a capsule as well as at least one perforating element protruding from said supporting surface, wherein a screen element is provided in the supporting surface having a plurality of screen perforations through which the extraction product can be discharged, the extraction product escaping out of the capsule through one of the openings created by the perforating element.

16 Claims, 9 Drawing Sheets

(56) References Cited

U.S. PATENT DOCUMENTS

| | | | |
|---|---|---|---|
| 7,946,217 B2* | 5/2011 | Favre et al. | 99/295 |
| 2005/0172822 A1* | 8/2005 | Macchi et al. | 99/295 |
| 2006/0196364 A1* | 9/2006 | Kirschner | 99/295 |
| 2008/0156196 A1* | 7/2008 | Doglioni Majer | 99/295 |
| 2008/0216666 A1* | 9/2008 | Doglioni Majer | 99/295 |
| 2008/0257165 A1* | 10/2008 | Bolzicco et al. | 99/295 |
| 2008/0264267 A1* | 10/2008 | Doglioni Majer | 99/295 |
| 2009/0029021 A1* | 1/2009 | Nielsen et al. | 426/433 |
| 2009/0126577 A1* | 5/2009 | Ternite | 99/295 |
| 2009/0205503 A1* | 8/2009 | Cortese | 99/295 |
| 2010/0064899 A1* | 3/2010 | Aardenburg | 99/295 |
| 2010/0107889 A1* | 5/2010 | Denisart et al. | 99/295 |
| 2010/0239733 A1* | 9/2010 | Yoakim et al. | 426/431 |
| 2010/0313766 A1* | 12/2010 | Suggi Liverani et al. | 99/295 |
| 2011/0027425 A1* | 2/2011 | Heijdel et al. | 426/77 |
| 2011/0033580 A1* | 2/2011 | Biesheuvel et al. | 426/77 |
| 2011/0265659 A1* | 11/2011 | Giua | 99/295 |

FOREIGN PATENT DOCUMENTS

| | | | | |
|---|---|---|---|---|
| WO | | 2008023057 | 2/2008 | |
| WO | WO 2008023057 A2 * | | 2/2008 | A47J 31/40 |

* cited by examiner

DEVICE FOR DISCHARGING AN EXTRACTION PRODUCT OUT OF A PORTION PACKAGING; PUNCTURING DEVICE AND EXTRACTION APPARATUS

BACKGROUND OF THE INVENTION

1. Field of the Invention

The invention relates to extraction apparatuses for preparing beverages or the like from an extraction material, for example ground coffee, which is contained in a capsule. Said invention relates, in particular, to a discharge device for discharging an extraction product from the capsule, to a puncturing device for puncturing the portion pack, and to an extraction apparatus having a discharge device and/or puncturing device of this kind.

2. Description of Related Art

Extraction apparatuses for preparing beverages or the like from an extraction material which is contained in a portion pack are known, for example, as coffee or espresso machines and continue to enjoy increasing popularity. In many corresponding systems, the portion packs are in the form of capsules in which the extraction material is enclosed, for example, in an air-tight manner. For the purpose of extraction, the capsule is punctured from two opposite sides. An extraction liquid—generally hot water—is introduced on the first side. The extraction product is discharged from the capsule on the second side. Depending on the beverage to be prepared and the system, a considerable pressure, of for example 5-20 bar, may prevail in the interior of the capsule in the process, this making great demands on the puncturing and discharge mechanism.

The capsule systems in which water is introduced into the capsule on an injection side, while the capsule is initially intact on the extraction side, have been disclosed as corresponding systems in the first instance. Under the pressure of the introduced water, the extraction-side boundary of the capsule is pressed against a, for example ribbed, structure and, in the process, subjected to such stress that it breaks and the extraction product can flow out of the capsule. A system of this kind can operate only with a material which is only very slightly plastically expandable and has a limited stress load capacity which is reached when the material is pressed against a rib or the like by the internal pressure in the capsule. To date, it has only been possible to use aluminum as a material of this kind. Examples of systems of this kind are disclosed in EP 0 521 188 and U.S. Pat. No. 5,897,899.

Further disclosed have been systems in which the capsule is pierced by a perforation tip on the extraction side, for example by positioning in the brewing chamber and before the brewing process is started. In systems of this kind, the extraction product is passed through the perforation spike; the coffee grounds remain in the capsule. The capsule wall of systems of this kind can be composed of plastic—for example polypropylene with an oxygen-tight barrier layer—, with the perforation tips then having to be very sharp in this case on account of the very high elongation at break of such materials; puncturing of plastic capsules of this kind is not trivial.

WO 2008/023057 describes a corresponding means for penetrating a portion pack using perforation tips which each have a surface which is inclined in the perforation direction and has openings in a perforated sieve structure. The purpose of these means is to improve conduction properties. However, the highly complex production method is a disadvantage.

EP 1 783 066 and WO 95/25457 each describe a discharge device having a large number of perforation tips, with each perforation tip having a passage opening or a passage channel. Even though the discharge device in these documents is called a "filter plate", the passage openings are provided in the respective perforation tips and not in a plate-like element which is arranged outside the capsule. The passage openings in discharge devices of this kind necessarily have a certain minimum diameter of, for example, approximately 400 µm, so that enough liquid can pass through in a sufficiently reliable manner and without blockages. However, at this size, the opening has only a limited filter effect, and therefore fine particles of the coffee grounds (or residues of another extraction material) can reach the beverage—besides, the extraction material meets very high requirements in respect of the regularity of particle size, this entailing additional expenditure. It is an object of the invention to provide a discharge device and a puncturing device for extraction apparatuses and also a corresponding extraction apparatus, which devices and apparatus overcome the disadvantages of the prior art and have good conduction properties and are simple to produce.

BRIEF SUMMARY OF THE INVENTION

According to a first aspect of the invention, a discharge device is provided comprising a supporting surface for bearing against a surface region of a capsule and at least one perforation element which projects from this supporting surface, wherein the supporting surface is defined by a sieve support with a sieve element. The sieve support comprises at least one passage opening covered by the sieve element. The sieve element comprises a large number of perforations through which the extraction product can be discharged, said extraction product emerging from the capsule through an opening which is produced by the perforation element.

The perforation element projects from the supporting surface in a medial direction, that is to say in the direction of the interior of the capsule with reference to the capsule. In this text, the directions "inward" and "outward" generally relate to the capsule.

The supporting surface forms a boundary surface for the capsule toward the outside during the puncturing process and during the brewing process. Even when the capsule is under pressure, no portion of the capsule will be outside the plane which is defined by the supporting surface during the process. The supporting surface is flat in the sense that a capsule with a capsule wall which is composed, for example, of polypropylene and has, for example, a wall thickness of 0.3 mm bears flat against the supporting surface when it is pressed against it with enough force (at this point it is perforated by the perforation tips); a hydrostatic internal pressure in the capsule is not required either for perforation or for flat positioning.

The sieve element can be in the form of a microperforated film or foil, for example.

The supporting surface which is defined by a base element (for example the brewing sieve plate which is formed by the sieve support with the sieve element) can be a supporting plane. However, it can also be made up of a plurality of supporting planes, or it can be bent. The manner of operation of the invention is not dependent on the form of the supporting surface.

This approach allows a particularly simple construction. For example, the supporting surface can be formed by a sieve support which is flat in sections and can have relatively (in comparison to the sieve perforations) large through-passage openings. A sieve of the known type with microperforations (microperforated film or foil) can be mounted flat on this sieve support. Said perforations are formed by the microperforations in the sieve at those points where the sieve is stretched across one of the through-passage openings. The through-passage openings or at least some of the through-passage openings are preferably located in the region of the perforation elements. This sieve support technology is known per se for professional commercial coffee machines but—because it belongs to a complementary technology with entirely different requirements—has never been considered for use in coffee machines for preparing beverages from an encapsulated extraction material.

The perforation elements are preferably designed to perforate a plastic wall, for example a polypropylene wall, of a capsule with a wall thickness of between 0.2 mm and 0.4 mm, in particular of 0.3 mm. A material with this property and wall thickness is very tough and makes corresponding demands on the perforation tip and/or perforation edge. Elements which comprise a correspondingly sharp perforation tip are particularly suitable. The perforation elements should therefore be designed such that a capsule body which is composed of polypropylene and comprises a wall thickness is perforated when it is pressed against the discharge device, until the capsule bears flat against the supporting surface next to the perforation elements. These conditions preferably also apply for the injector device which will be described below.

The perforation elements are generally free of passage channels which run substantially axially through the perforation elements (here, axially means the direction perpendicular to the supporting surface). Said perforation elements serve merely to perforate the capsule, with the extraction product on the one hand and the grounds on the other actually being separated by the brewing sieve. The coffee grounds which are pressed against the brewing sieve can be compacted, as is known from fully automatic coffee machines. The perforation elements themselves can therefore be relatively simple, unslotted and compact elements without openings, for example can be in the form of metal sheets according to the second aspect of the invention.

In contrast, the passage openings—and, with them, the location of the separation between the extraction product on the one hand and the grounds on the other—are provided on the sieve support or sieve element and therefore arranged in the supporting surface.

The term sieve element describes an element whose perforations are of such a size that the extraction product can flow through but the extraction material is retained. In the case of ground coffee, a sieving effect is achieved by a perforation size up to approximately 0.3-0.4 mm. The size of the perforations is preferably such that they also retain comparatively fine extraction material dust. It has become evident that a preferred diameter range for perforations is between 0.1 mm and 0.3 mm, particularly preferably between 0.15 and 0.25. The perforations can be cylindrical. However, said perforations can also be conical with a diameter which decreases in the direction of the capsule, wherein the mentioned diameter range then relates to the diameter which is measured on the capsule-side surface of the sieve element.

In a projection onto the supporting surface, the perforation element is preferably of a shape other than convex, so that the perforation element bounds a portion of the supporting surface.

A puncturing device is provided according to a second aspect of the invention, it being possible for said puncturing device to be in the form of a discharge device—for example according to the first aspect of the invention—or in the form of an injector device for introducing the extraction liquid. The puncturing device comprises a supporting surface for bearing against a surface region of a capsule and at least one perforation element which projects out of this supporting surface, with the at least one perforation element comprising a metal sheet which protrudes from the supporting surface, for example in an approximately perpendicular manner. The metal sheet is bent, kinked (for example folded) or composed of a plurality of sheet metal pieces which are positioned at an angle relative to one another.

These properties of the perforation element have the important advantage that the perforation element can be produced in a simple manner. Manufactured as a part at least partially separate from the support which forms the supporting surface, it can be easily fastened to said support. The fastening operation can be performed, for example, by means of fastening lugs of the perforation element which engage in corresponding openings in the base element and are fastened there by being welded, adhesively bonded or soldered, for example, to the base body. The perforation element can also be at least partially integrally formed with the support and be formed, for example, by a part which is bent away from said support.

In addition, the form which is made up by the bent sheet metal pieces, or made up of a plurality of sheet metal pieces which are positioned at an angle relative to one another, is self-supporting, that is to say the mechanical stability is much higher than the stability of a simple sheet metal strip which projects away from the supporting surface for a given sheet metal thickness—which may be between 0.05 mm and 0.6 mm.

Despite the fact that they are simple to produce, perforation elements according to the approach according to the invention also provide effective puncturing and good passage properties given suitable shaping of the edges and/or of tips.

On account of the design of the perforation element as a bent or folded metal sheet or a component which is composed of a plurality of sheet metal pieces which are positioned at an angle relative to one another, the perforation element bounds at least a portion in the supporting surface, said portion being partially surrounded by the perforation element. A feed or discharge opening or a plurality of feed and discharge openings for the extraction liquid or the extraction product can be provided in said portion or project into said portion. If the second aspect of the invention is combined with the first aspect, the sieve surfaces are preferably located at least partially in the region of the bounded portion(s).

The metal sheet preferably does not comprise a constant width (corresponding to the height of the perforation element over the supporting surface), but rather a width profile which causes the perforation element to form a perforation tip. This perforation tip can be situated, for example, approximately in a plane of symmetry of the perforation element.

In addition or possibly as an alternative to tapering into a tip, the metal sheet can be sharpened at the edge which projects away from the supporting surface, so that said edge forms a perforation edge or a cutting edge.

According to one embodiment, the perforation element comprises an integral metal sheet which can be produced, for example, by stamping or laser-cutting and subsequent shaping, and is folded along a folding line and has two flat parts which form an angle relative to one another. The width of the two parts runs in the direction of the folding line, so that a tip is formed. If the perforation element is symmetrical in relation to a plane, the metal sheet can be in the form of a pentagon or hexagon with mirror-image symmetry before folding.

The following statements concerning a retaining web and concerning the form of the perforation element relate to both aspects of the invention, that is to say the corresponding advantageous features can be provided in devices according to the first aspect, according to the second aspect and according to both aspects.

According to a particularly preferred embodiment, the perforation element or at least one of the perforation elements comprises at least one retaining web. Said retaining web is arranged in the immediate vicinity of that part ("perforation edge part") of the perforation element which forms the cutting edge and, like this part, projects away from the supporting surface in the direction of the space which is taken up by the capsule during the extraction process. However, one edge in the direction of the capsule is non-cutting, that is to say is not sharp enough that it pierces or would pierce the capsule wall, at least in regions. The retaining web preferably has a lower height than the perforating edge—at least where the edge is non-cutting—and butts against the perforation edge part, for example. According to preferred embodiments, the surface which is bounded by the perforation element corresponds at least partially to the surface of a through-passage opening, that is to say a surface which is provided with perforations (for example arranged in a grid) in a discharge device. The perforation element is particularly preferably formed such that the perforation edge part of the perforation element alone already bounds a surface, that is to say the section which is joined by the perforation edge part of the capsule runs in a bent manner or comprises a plurality of sections which are positioned at an angle relative to one another. The retaining web then preferably runs at least partially in the interior of the surface which is bounded by the perforation edge part.

At the discharge device end, the retaining web prevents the wall (capsule film or foil) of the punctured capsule from being pressed against the sieve surfaces during the brewing process (extraction process) on account of the pressure prevailing in the interior of the capsule, as a result of which the passage of the extraction product through the sieve surfaces could be prevented. Said retaining web is particularly suitable in conjunction with capsule walls which are composed of plastic, for example polypropylene. In contrast to aluminum foil, plastics are usually highly extensible and resilient, and this allows the retaining web to be in the form of, for example, a metal sheet which projects away from the supporting surface since an edge of this kind, which is not specially sharpened, does not readily sever the capsule wall given a corresponding refinement. However, the retaining web can comprise a sharp tip or a sharp edge section in order to reinforce the perforation effect of the perforation edge part.

A retaining web can likewise be provided in the injector device, said retaining web additionally reinforcing the opening effect of the perforation edge. Very generally, at least one retaining web may possibly be provided in the discharge device, in the injector device or in both devices.

By way of example, perforations are provided, as mentioned, at least in the region of the surface which is bounded by the perforation element.

The retaining web can butt against the perforation edge part so as to form an angle relative to said perforation edge part.

According to preferred embodiments of the discharge device, the retaining web is arranged such that it extends at least partially over a region with perforations, that is to say crosses a passage opening.

The perforation element can comprise at least two sheet metal parts which form an angle relative to one another and which have, for example, a width which runs in the direction of their common edge. As an alternative to this, the perforation element can have, in regions, in a projection onto the supporting surface, the form of a, for example, incomplete arc of a circle and be spiked, that is to say have the form of a truncated pipe. A further part, which can form the retaining web or the perforation edge, can run in the interior of the surface which is bounded by the angle or by the arc of a circle and optionally project out of it; this part can be flat or bent/angled and optionally comprise a plurality of parts.

According to a specific embodiment, the perforation element with a cutting edge part and a retaining web can be produced from a single part, for example from a truncated metal pipe element which forms an inclined and a cutting edge. At the same time, the cutting edge of the metal pipe element forms the cutting edge of the perforation element. A partial piece of the metal pipe element beneath the cutting edge is bent inward so as to form the retaining web.

According to a further specific embodiment, the retaining web can be composed of a material other than the cutting edge part. In this embodiment, the retaining web can also be considered to be a part which is separate from the perforation element.

In particular, the brewing sieve or injector plate can comprise web openings. The retaining webs can be integrally formed on a support body—for example composed of injection-molded plastic—and project inward, from outside, through the web openings. These embodiments have the advantage that no additional material and assembly costs are produced for the retaining webs. The costs of production of a plastic body are virtually independent of whether additional small projections (which form the retaining webs) are provided or not, and an independent fastening process is not required for the retaining webs.

The invention likewise relates to an extraction apparatus, for example a coffee machine, which comprises a discharge device and/or injector device of the above-described kind. Further elements of the apparatus, such as the brewing liquid preparation means, brewing module, dispensing unit, housing etc., of the extraction apparatus can be formed, for example, in the manner known from the prior art and are not the subject matter of the present invention, for which reasons they are not explained in any detail here either. Apparatuses of this kind are sufficiently well known to a person skilled in the art. A person skilled in the art will also find ways of designing apparatuses of this kind in the literature, for example WO 2008/023057.

BRIEF DESCRIPTION OF THE DRAWINGS

Exemplary embodiments of the invention will be described below with reference to drawings. In the drawings, identical reference symbols denote identical or similar elements. The drawings are not true to scale and show elements, which partially correspond to one another, in sizes which differ from figure to figure. In the drawings.

DETAILED DESCRIPTION OF THE INVENTION

Figure 1:
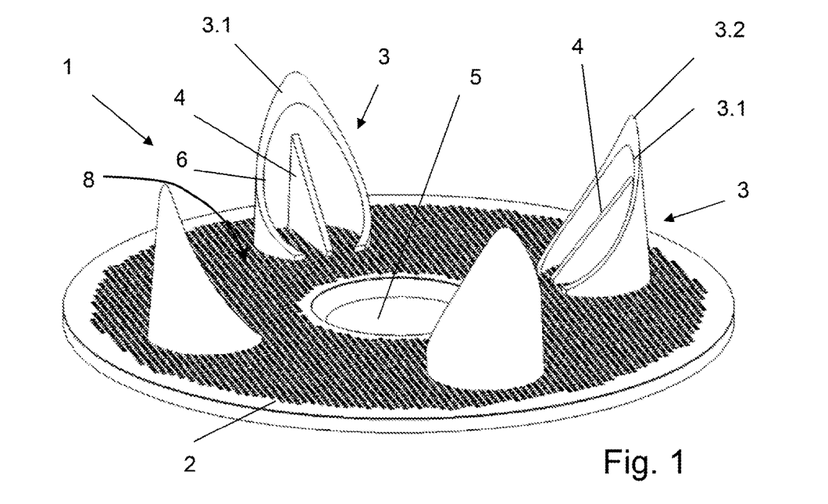
FIG. 1 shows an exemplary embodiment of a puncturing and discharge device according to the invention.

The discharge device 1 shown in FIG. 1 is in the form of a brewing sieve plate 2 with a plurality of perforation elements 3. The brewing sieve plate is produced from a sieve support with a microperforated sieve which is mounted on the top side—that is to say in the direction of the capsule—this being explained in greater detail below. Said brewing sieve plate has a positioning and centering hole 5 in the middle. The surface of the brewing sieve plate 2 situated at the top in FIG. 1 serves as an abutment surface for the capsule.

In the illustrated embodiment, each of the perforation elements has a perforation edge part 6 and a retaining web 4.

The perforation edge parts 6 are in the form of metal pipe pieces which are obliquely truncated, that is to say they have the form of a cylindrically bent sheet metal wall with a width (corresponding to the height of the perforation element) which is not constant. The thickness of the sheet metal wall is preferably between 0.15 mm and 0.5 mm, for example between 0.2 mm and 0.3 mm. The sheet metal material can be stainless steel.

The sheet metal walls are perpendicular to the abutment surface, that is to say parallel to the perforation direction. At the capsule-side end, the pipe pieces comprise a region 3.1 which tapers in terms of thickness in the direction of a perforation edge. The point of the perforation elements which is highest relative to the perforation direction is called a perforation tip 3.2 here. The perforation elements have mirror-image symmetry, with the plane of symmetry running through the perforation tip.

Four perforation elements 3 are provided in the example shown, said perforation elements being arranged at regular intervals around the center of the brewing sieve plate. An arbitrary number of perforation elements which are arranged at regular and irregular intervals are provided in the general case, with the number of perforation elements preferably being between 1 and 6.

Each perforation element 3 has a web 4 (retaining web) which is likewise substantially in the form of a sheet metal wall which runs substantially parallel to the perforation direction and therefore perpendicular to the supporting surface 8. However, in contrast to the perforation edge parts, said webs do not have a perforating edge or tip. Instead, the edge of the webs 4 is formed and matched to the capsule material such that the capsule material is not severed or pierced by the webs at the pressures which prevail during the brewing process. The webs 4 butt against the respectively associated perforation edge parts. However, they are offset in relation to the perforation edge parts, that is to say the height of the webs is lower in relation to the perforation direction. The height also decreases as a function of the distance from the perforation element.

The webs run partially in the interior of the perforation elements, that is to say in the interior of the area which is bounded by the respective sheet metal wall.

During the brewing process, the webs have the function of preventing the capsule wall from being pressed completely onto the sieve surface. Rather, the capsule wall will be placed over the webs in the manner of a tent during the brewing process. In addition, the retaining webs also contribute to preventing relatively large quantities of particles reaching the brewing sieve during the brewing process by the particles being retained by the capsule wall.

Figure 2:
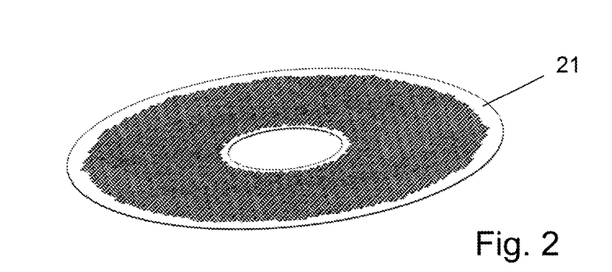
FIG. 2 shows a sieving film or foil for a device according to FIG. 1.
Figure 3:
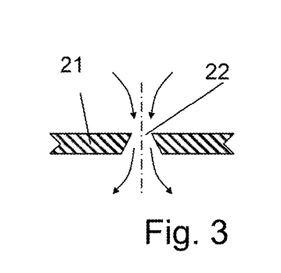
FIG. 3 shows a detail of FIG. 2.
Figure 4:
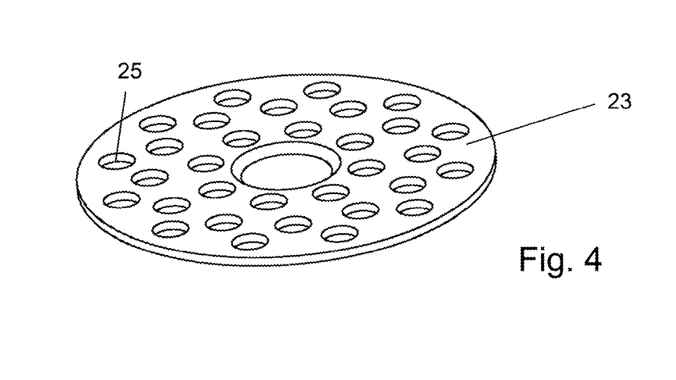
FIG. 4 shows a sieve support for a device according to FIG. 1, FIGS. 5 to 8 each show a further exemplary embodiment of a puncturing and discharge device according to the invention.

The brewing sieve plate comprises a sieve support 23 and a sieveing film or foil 21 which is mounted on said sieve support, this being even more clearly shown in FIGS. 2 and 4. The sieveing film or foil 21 can be formed in the manner of sieveing films or foils which are known per se, for example as a foil which is composed of stainless steel with a thickness of, for example, 0.05-0.1 mm, and can be fastened to the sieve support by adhesive bonding, welding, soldering or another known technique. The size of the perforations 22 in the sieveing film or foil is preferably between 0.1 mm and 0.3 mm, particularly preferably between 0.15 mm and 0.25 mm (diameter of the approximately circular holes at the narrowest point). As illustrated in FIG. 3, the perforations 22 can comprise a slightly conical profile. A slightly conical profile of this kind is produced during production of a sieveing film or foil, which is also known as a microperforated film or foil, in an etching method. The sieveing film or foil is preferably now fastened on the sieve support such that the narrowest point is located on the top side, that is to say on the capsule side. This prevents particles of the extraction product from being able to accumulate in the perforations. The direction of flow of the extraction product is indicated by arrows in FIG. 3.

If the production method for the microperforated film or foil allows, the perforations can also be cylindrical, in contrast to the illustration.

The sieve support 23 is in the form of a metal sheet, which is, for example, likewise composed of stainless steel, with a thickness of, for example, between 0.2 mm and 2 mm. Said sieve support comprises a plurality of through-passage openings 25 through which the extraction product can be discharged in the direction arriving from the perforations. Discharge arrangements for passing on extraction product arriving from pass-through elements are known from the prior art and will not be described here.

The through-passage openings 25 can be distributed in various ways over the surface of the sieve support. However, through-passage openings are provided at least where the perforation elements 3 and the webs 4 are located. For example, a perforation element 3 of the kind shown in FIG. 1 can comprise an inside diameter which is slightly larger than the diameter of the corresponding pass-though opening in the sieve support and can be arranged approximately coaxially to the corresponding through-passage opening and bound thus. The web then extends transversely across the through-passage opening. The tent-like structure which is formed by the capsule film or foil during the brewing process is therefore ideally located over the through-passage opening.

Those through-passage openings which do not have any associated perforation elements serve for discharging the extraction product if this occurs with a strong flow and the through-passage openings which are associated with the perforation elements can, under certain circumstances, no longer cope with the entire flow—the extraction product can emerge through any one of the provided through-passage openings and is discharged through a, for example common, discharge line.

The sieveing film or foil is preferably mounted on the sieve support on the top side, that is to say on the capsule side. This reduces the problem of possible contamination of the through-passage openings 25 and the mechanical loading on the connection between the sieve support and the sieveing film or foil.

Figure 5:
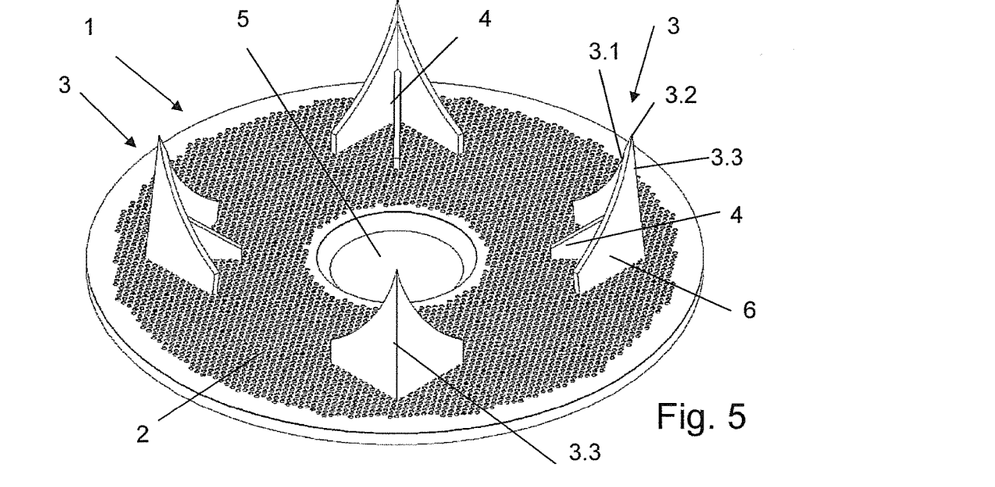

The discharge device 1 which is shown in FIG. 5 differs from those according to FIGS. 1-4 by virtue of the shape of the perforation elements 3. The perforation edge parts 6 are formed in the manner of a metal sheet which is kinked along a rear edge 3.3. In addition, the sheet metal walls are not exactly perpendicular to the supporting surface but are inclined slightly away from the perforation direction, specifically inward, that is to say in the direction of the area which is bounded by the sheet metal walls. The angle of inclination is preferably between 0° and 10°, for example between 2° and 5°.

The design of the perforation elements in the manner which is illustrated in FIG. 5 is expedient firstly because a very distinctive yet mechanically very stable perforation tip 3.2 can be produced in this way. The mechanical stability is achieved by the rear edge 3.3 tapering into a perforation tip. Secondly, advantages in terms of production are also achieved, this being explained in somewhat greater detail in the text which follows.

The webs 4 of the embodiment according to said FIG. 5 can correspond in terms of design and function to those of FIG. 1, that is to say the explanation given in relation to FIG. 1 also applies to FIG. 5 in this respect. In the shown variant, the webs 4 of the two embodiments differ in that the width of the webs 4 according to FIG. 1 widens in the direction of the end which is remote from the perforation edge part, that is to say have the form of a right-angled triangle as a whole, while the webs 4 according to FIG. 5 have a square basic shape. However, there is freedom of design in terms of the exact configuration of the webs; in particular, the discharge devices would also function if, for example, the webs of FIGS. 1 and 5 were exchanged. Other shapes of web are also feasible, for example an overall rectangular shape with a rounded or beveled corner etc.

Figure 6:
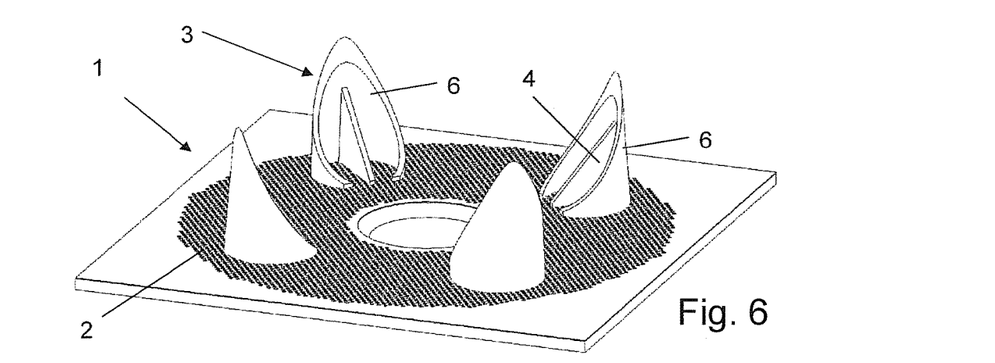
Figure 7:
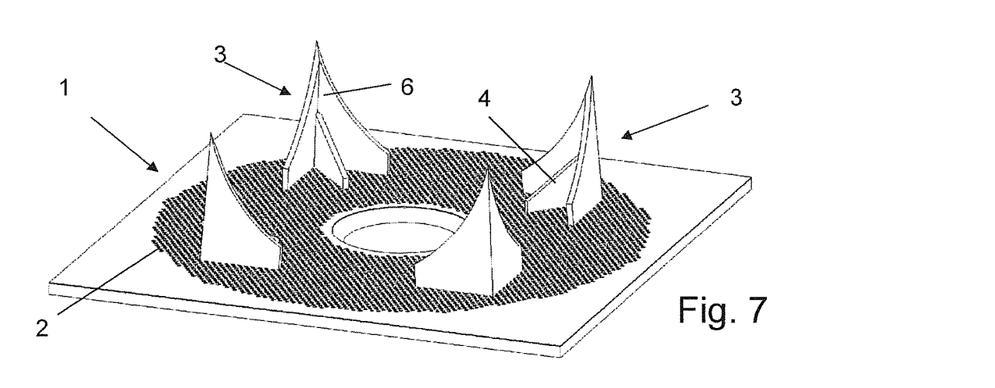

The discharge devices 1 of FIGS. 6 and 7 correspond to those of FIGS. 1 and, respectively, 5. However, they differ in terms of the shape of the brewing sieve plate 2. Said brewing sieve plate is square. As such, it is suitable for capsules which have a shape with differs from the usually rotationally symmetrical shape and which are, for example, in the form of a cube or cuboid or run in a region which has a rectangular cross section.

Figure 8:
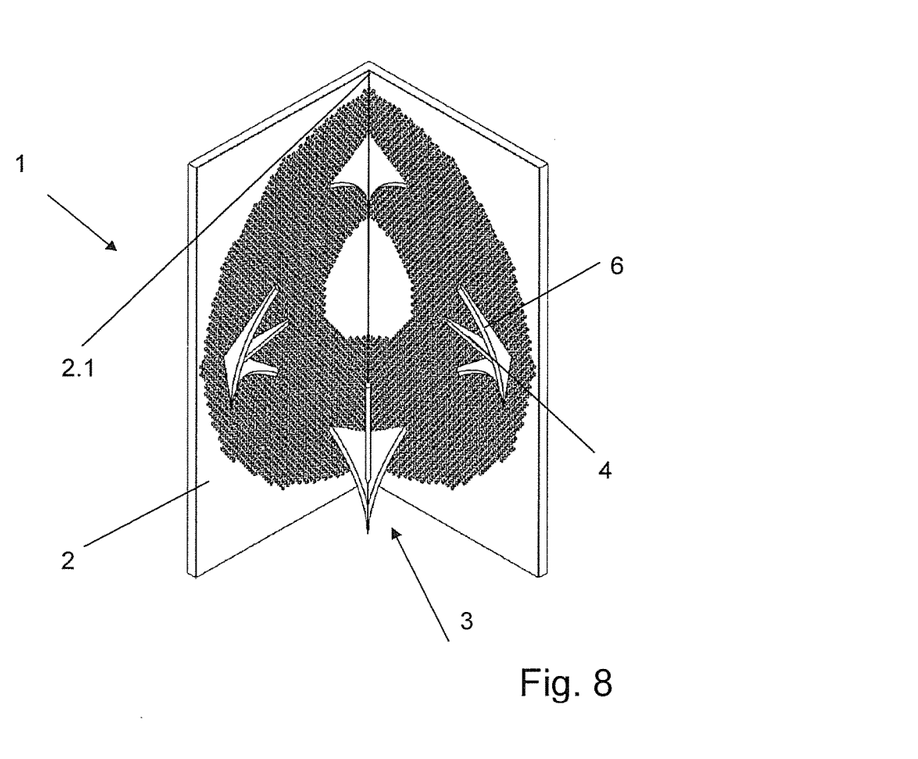

Very generally, the invention is not dependent on the shape of the capsule, but rather can be used in connection with any kind of capsules, in particular capsules without their own filter device. Accordingly, other outlines of the brewing sieve plate, for example rectangular, hexagonal, elliptical etc., outlines are also possible. Furthermore, it is in no way necessary for the supporting surface to be formed by a substantially flat brewing sieve plate. Basic elements with a bent or kinked configuration or a configuration which runs into an edge 2.1 or corner are also feasible, these defining correspondingly non-planar supporting surfaces or supporting surfaces which are planar only in regions, as illustrated in FIG. 8. The perforation elements 3 accordingly do not have to project in a direction which is parallel or almost parallel to one another, as in the embodiments shown, but rather can also project in different directions in accordance with the supporting surface. However, embodiments in which the perforation elements are substantially parallel (that is to say at most inclined slightly away from the perforation direction, for example at most by an angle of 10°) to the perforation direction are preferred.

Figure 9:
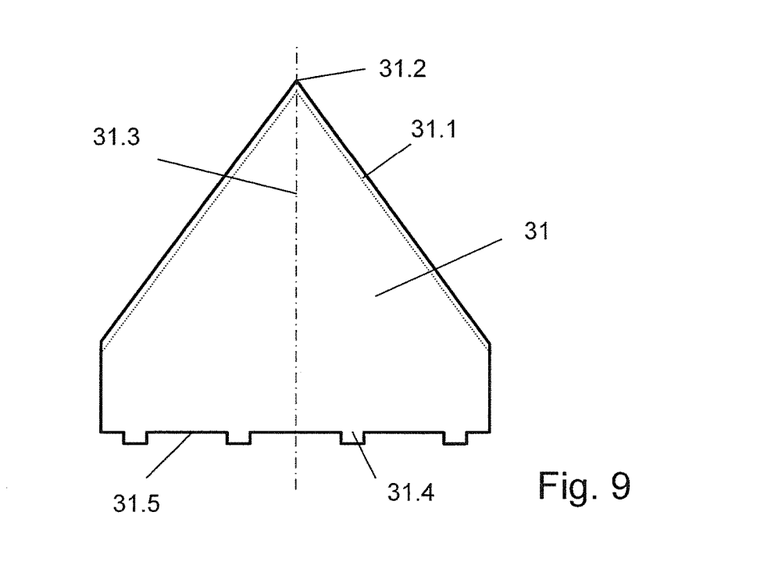
FIGS. 9 and 10 show different blanks for forming a perforation element for puncturing and discharge devices of the type shown in FIGS. 5, 7 and 8.

FIG. 9 shows a blank 31, for example a stamped part or a sheet metal part which is produced by laser cutting, for forming a perforation edge part as shown in the embodiments according to FIG. 5 or 7 or below according to FIG. 14. The stamped part has a basic shape which tapers into a point 31.2 which becomes the perforation tip 3.2 after said stamped part is folded along the folding line 31.3 (corresponding shaping methods are known, for example bending shaping or deep-drawing). A region 31.1, which tapers toward the outside in terms of thickness, for forming the perforation edge is likewise shown.

In addition to these features, the blank 31 also has a plurality of protruding fastening lugs 31.4 which engage in corresponding holes in the brewing sieve plate (or injector plate) when said blank is fastened to the brewing sieve plate (or else to the injector plate in the embodiments which are described below). The fastening lugs can be welded to the brewing sieve plate or injector plate on the lower side of the brewing sieve plate, that is to say on the side of the brewing sieve plate which is averted from the capsule. Overall, this produces a noticeably simple and therefore cost-effective production and fastening method for the perforation elements using known sheet metal shaping techniques. In spite of this, the mechanical stability and the efficiency of the perforations is very good on account of the selected, self-reinforcing design with regions which are folded approximately at right angles to one another.

Figure 10:
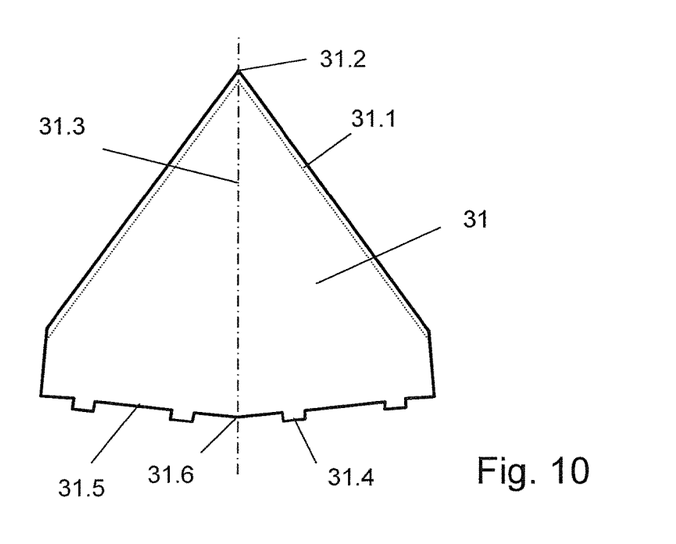

The use of the blank 31 according to FIG. 9 leads to perforation elements which project away from the supporting surface at right angles, that is to say parallel to the perforation direction. A slight inclination, as shown in FIGS. 5 and 7, is achieved by the base line 31.5 which is on the lower side in FIG. 10 (that is to say the side which bears on the supporting surface in the assembled state) not running exactly perpendicular to the folding line 31.3, but rather at a slight angle to the perpendicular, so that the base line forms an obtuse angle with the folding line 31.3 at the point 31.6 of intersection, as is illustrated in FIG. 10.

Figure 11:
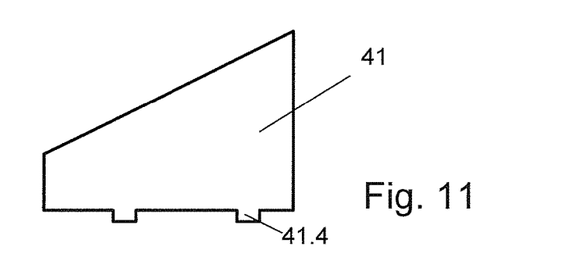
FIG. 11 shows a blank for forming a retaining web for puncturing and discharge devices of the type shown in FIGS. 5, 7 and 8, FIGS. 12a to 12d schematically show various perforation elements in a projection onto the supporting surface.

FIG. 11 shows a blank 41 for forming a web of the kind described above. Fastening is preferably performed by means of fastening lugs 41.4, as in the case of the perforation edge part.

Perforation elements of the kind which are shown in FIGS. 1 and 6 can analogously be fastened to the brewing sieve plate or (with or without a retaining web) to the injector plate and can, for example, also be produced analogously, it being possible to employ a sheet metal shaping method other than folding (or they are produced by a small metal pipe).

Figure 12A:
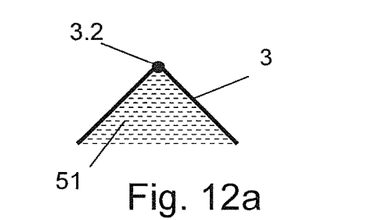
Figure 12B:
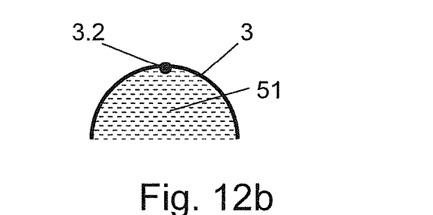
Figure 12C:
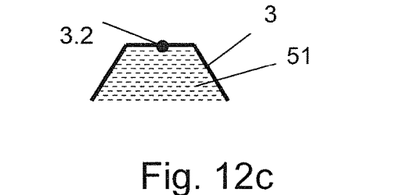
Figure 12D:
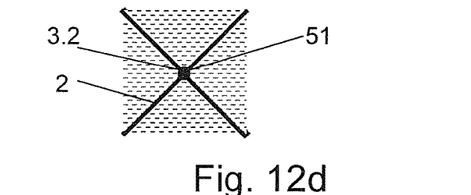

FIGS. 12*a*-12*d* show, highly schematically, the principle which has already been illustrated and according to which the perforation elements on the supporting surface bound a surface portion 51 which they partially surround. The bounded surface portion can be mathematically defined as a "convex envelope" of the projection of the perforation elements onto the supporting surface. The sieve surfaces and the webs preferably run at least partially in this bounded surface. FIG. 12a shows the embodiment which is shown in FIGS. 5 and 7, and FIG. 12b corresponds to the variant from FIGS. 1 and 6. FIGS. 12c and 12d show further variants. The metal sheet in the embodiment according to FIG. 12c is folded twice, with the perforation tip being situated in the plane of symmetry. As an alternative, it is also possible, for example, for two perforation tips to be provided, in each case at the point at which the fold is made. The variant according to FIG. 12d shows a perforation element which is made up of a plurality of sheet metal pieces and therefore is somewhat more complicated to produce.

Figure 13:
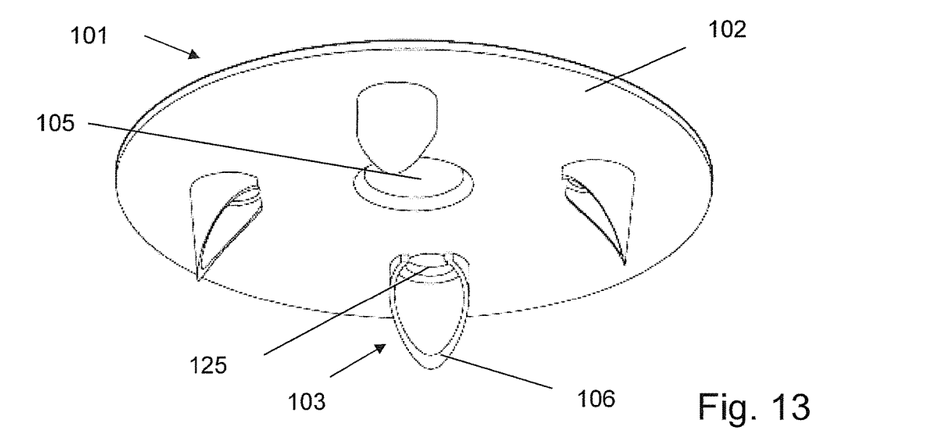
FIGS. 13 to 15 show puncturing devices which are in the form of injector devices FIGS. 16 and 17 respectively show a discharge device (without the sieve element) and an injector device according to a further embodiment of the invention.
Figure 14:
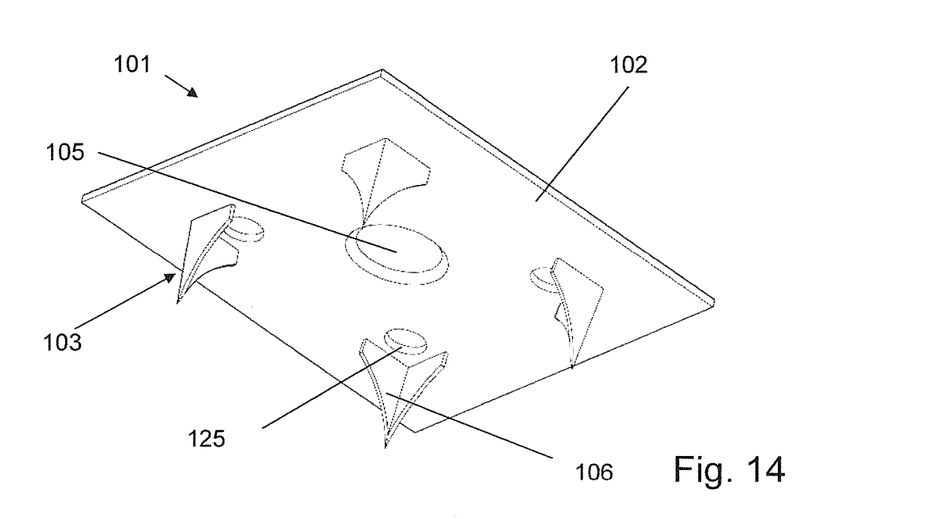
Figure 15:
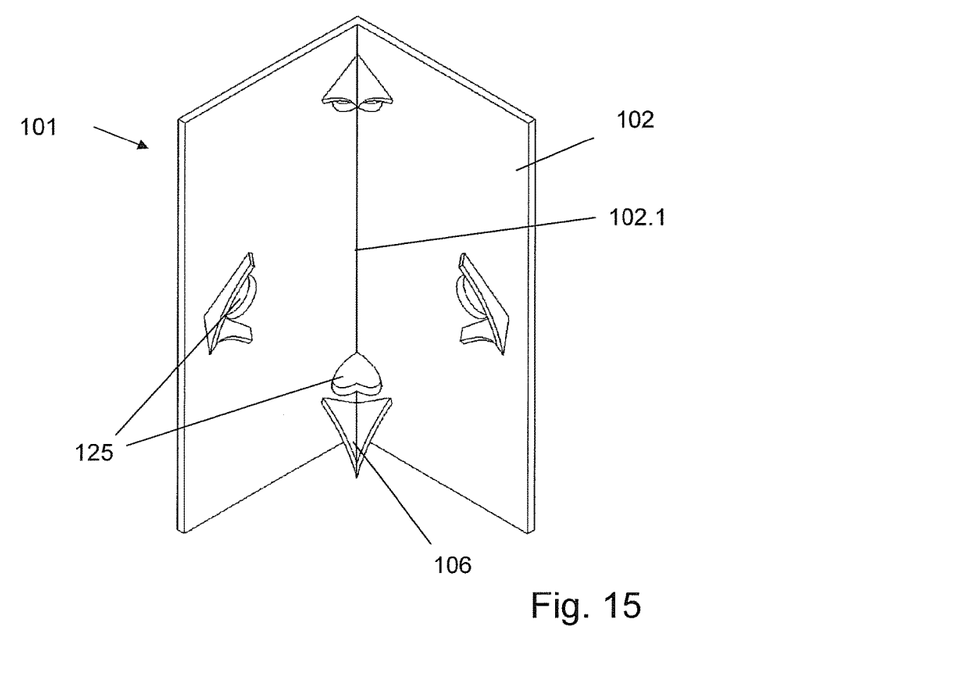

FIGS. 13-15 show refinements of the puncturing device not as a discharge device but as an injector device 101 through which the extraction liquid is supplied to the capsule—generally under pressure. In contrast to the discharge device, the injector device does not require a sieve, but rather the extraction liquid is supplied to the capsule, which has been pierced by the perforation elements 103, directly through the inlet openings 125. The webs of the puncturing device are not necessarily required either, since the pressure of the liquid pushes the liquid into the capsule, and not out of the capsule, during the brewing process. However, webs of the kind described with reference to the discharge device (not shown in FIGS. 13-15) are also advantageous in the injector device, depending on the capsule material.

In further contrast to the exemplary embodiments shown, the injector plate 102 comprises only as many inlet openings 125 as there are perforation elements. However, further inlet openings can also be positioned in other locations in principle.

FIG. 13 shows a first embodiment with perforation elements 103 like those of the discharge devices according to FIGS. 1 and 6. In the illustrated embodiments, the perforation elements comprise the perforation edge parts 106; however, they can also comprise retaining webs (not shown). FIG. 14 shows a second embodiment with a rectangular injector plate and with perforation elements 103 like the particularly advantageous perforation elements of the discharge devices according to FIGS. 5 and 7. The embodiment according to FIG. 15 comprises an injector plate 102 which forms an edge 102.1 and is particularly suitable for a polyhedral capsule, for example together with a discharge device as shown in FIG. 8.

Reference is made to the otherwise analogous teaching relating to the discharge device in respect of the design of the injector plate 101 and the design and arrangement of the perforation elements 103, the fastening of the perforation elements to the injector plate, and also to other properties of the base element, for example the positioning and centering hole 105.

Figure 16:
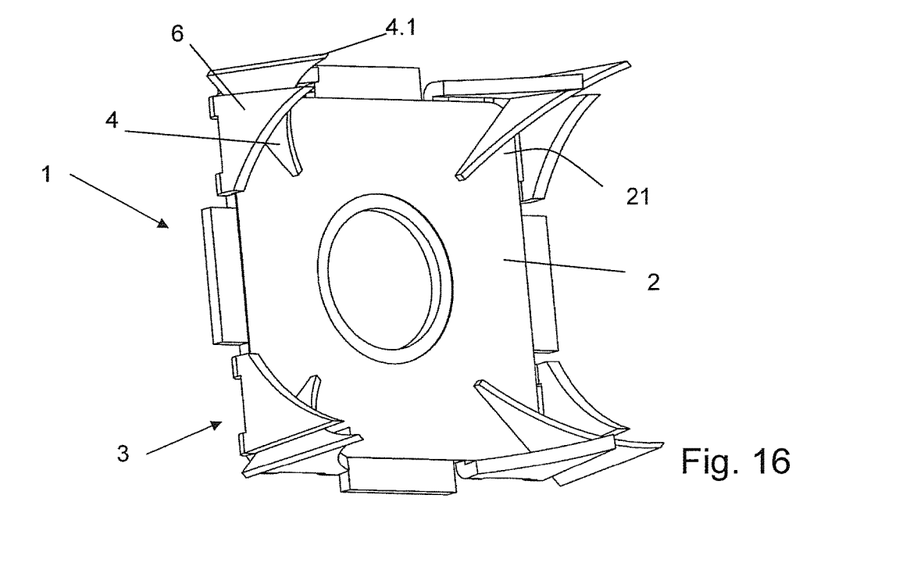
Figure 17:
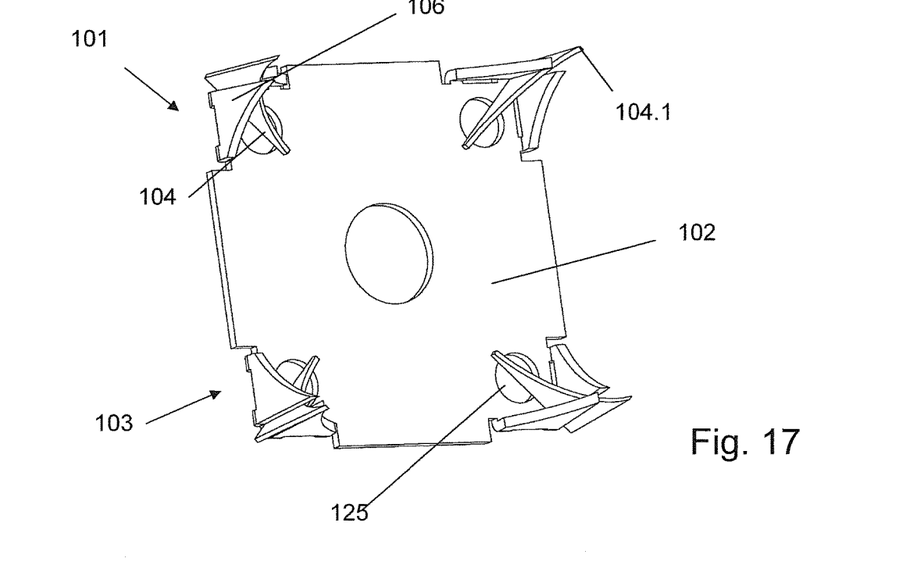

FIGS. 16 and 17 show an alternative embodiment of a discharge device 1 and, respectively, an injector device 101. The perforations in the microperforated sieve 21—preferably likewise present—are not shown in FIG. 16; beneath the microperforated plate, the sieve support (not visible in FIG. 16) comprises a plurality of through-passage openings, for example one through-passage opening for each perforation element 3, like the injector device 101. These embodiments differ from the embodiments described above by virtue of the following features:

The retaining webs 4, 104 of the perforation elements project beyond the perforation edge parts 6, 106 in terms of height (extension perpendicular to the supporting surface) and are equipped with a tip 4.1, 104.1 which initiates and assists the perforation process. However, as described above, the edge of the retaining webs 4, 104 is non-cutting at a distance from the tip.

The perforation edge parts 6, 106 are integral with the support (discharge device plate/brewing sieve plate 2) or injector plate 102 and are produced by folding excess lengths which project above said perforation edge parts. The retaining webs 4, 104 are flat and are fastened, for example, using the methods mentioned above.

These two features can be implemented independently of one another.

Figure 18A:
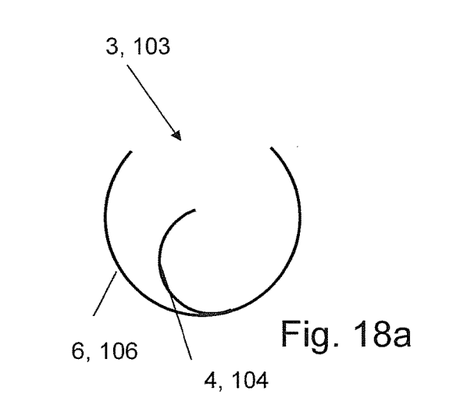
FIGS. 18a and 18b show views of a further embodiment of a perforation element.
Figure 18B:
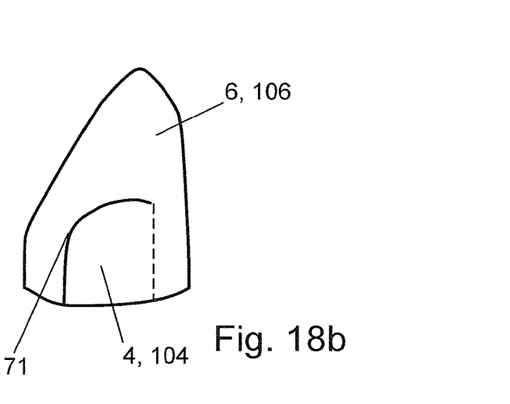

FIGS. 18a and 18b are a highly schematic sectional illustration (section along a plane parallel to the supporting surface) and a view of a further embodiment of a perforation element 3, 103. When produced from a metal-pipe-like starting product, a cut 71 is made and the retaining web 4, 104 is formed by bending the leaf, which is produced as a result, inwards (see FIG. 18a). As a result, the perforation element 3, 103 is integral with the perforation edge part 6, 106 and retaining web 4, 104.

The retaining webs, in particular, of the brewing sieve plate 2, and possibly also of the injector plate, do not have a perforating function but rather are intended to not sever the (plastic) wall of the capsule during the puncturing process or subsequently during brewing. Therefore, according to specific embodiments of the invention, the retaining webs can also be composed of a material which has a hardness which does not permit the formation of a very sharp cutting edge or tip for perforating a polypropylene capsule wall with a customary wall thickness of, for example, between 0.2 mm and 0.4 mm. Therefore, said retaining webs can, in particular, be produced from a material which differs from that of the perforating elements themselves. Embodiments in which the retaining webs are composed of a material other than that of the perforation tips and cutting edges, and in which this is used to ensure cost-effective production of the corresponding device, are described with reference to FIGS. 19-24.

Figure 19:
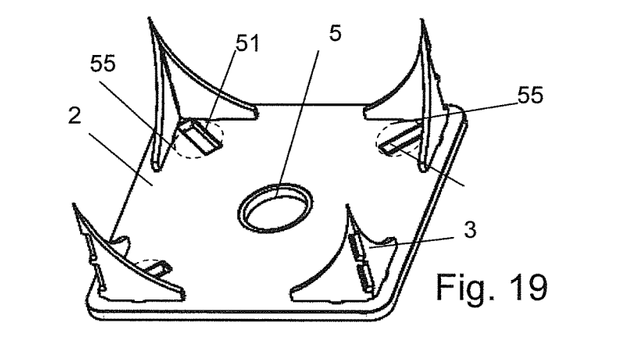
FIGS. 19 to 21 show a further discharge device.
Figure 20:
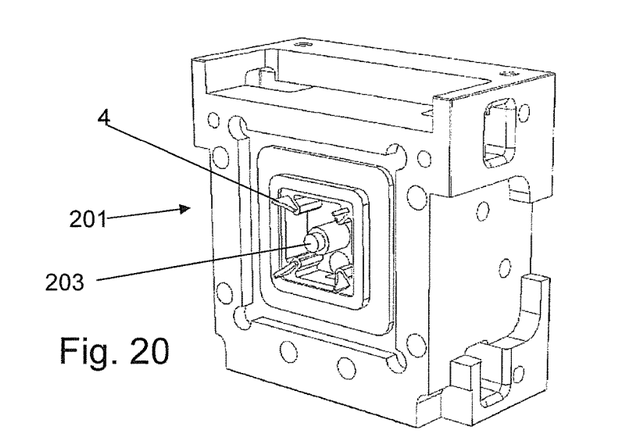
Figure 21:
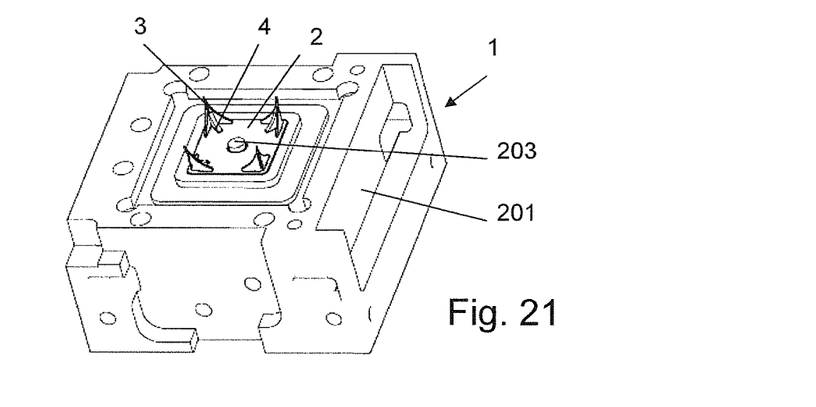

According to FIGS. 19-21, the discharge device 1 also has a discharge device support 201 in addition to the base element (of the brewing sieve plate 2). The base element 2 with the perforation elements 3 is mounted on said discharge device support, with a guide pin 203 engaging in the positioning and centering hole 5. The discharge device support 201 is a plastic body, for example produced by means of injection molding. The webs 4 which form the retaining webs are integrally formed on the discharge device support 201. To this end, the webs 4 pass through corresponding web openings 51 in the brewing sieve plate. As shown in FIG. 21, the guide webs are positioned such that they butt against the perforation edge parts or are at an only short distance from said perforation edge parts. Said guide webs are also offset in relation to the perforation edge parts, that is to say their height in relation to the perforation direction is lower, and also the height decreases as a function of the distance from the perforation element. The geometry of the perforation elements with the retaining webs is similar to the geometry which is described with reference to FIG. 5.

The perforations in the brewing sieve plate are not shown in FIG. 19. The dashed lines 55 indicate the approximate position of the pass-though openings in the sieve support which are situated beneath the microperforated film or foil.

Figures 22, 23, 24:
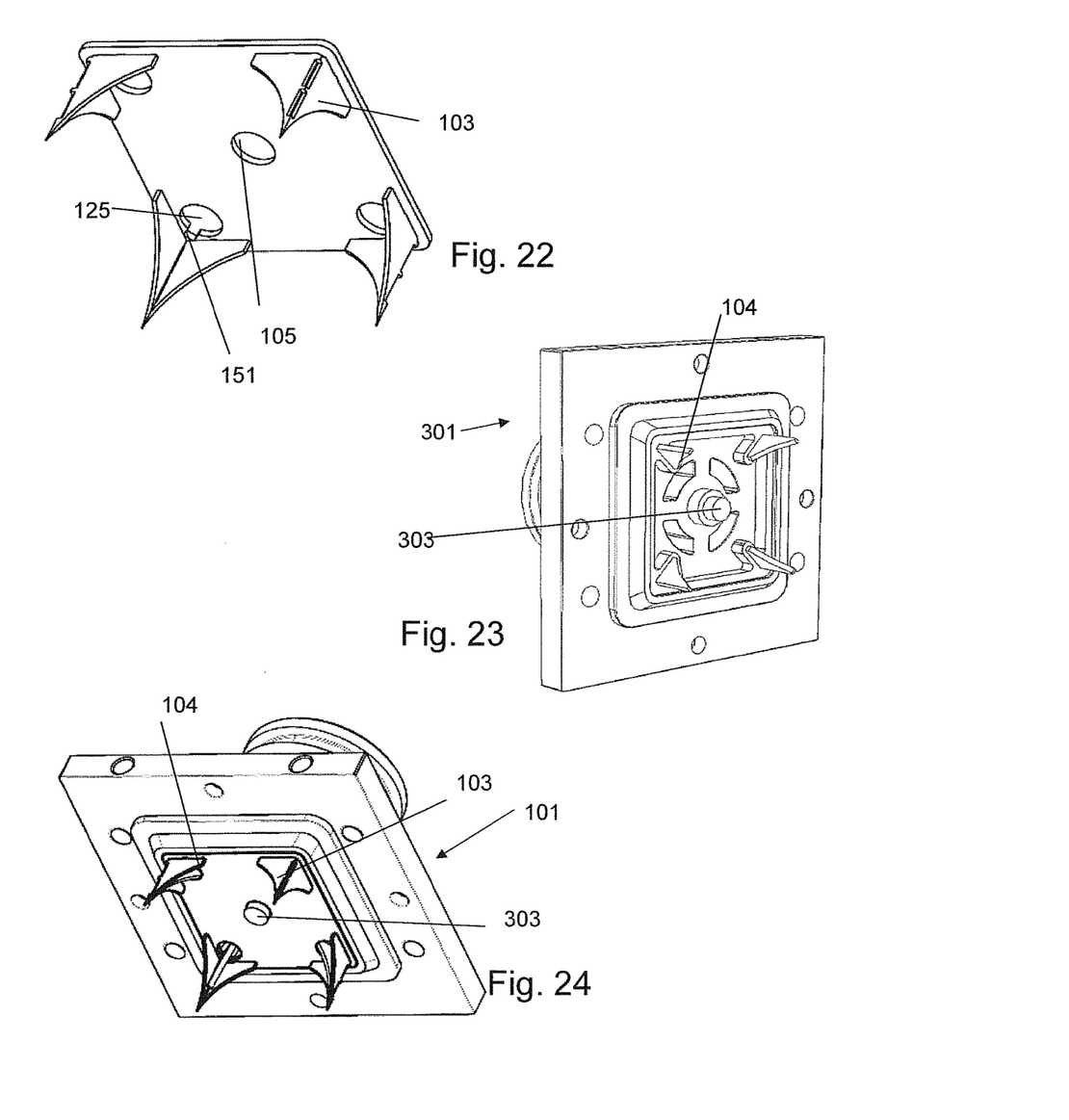
FIGS. 22 to 24 show a further injector device.

FIGS. 22 to 24 show an analogous design for an injector device 101. The inlet openings 125 in the injector plate 102 comprise a projection 151 which projects in the direction of the perforation elements 103, and at the same time form the web openings for the—optional—retaining webs 104 of the injector device. These retaining webs 104 are integrally formed on the injector device support 301 which is likewise provided in the form of a plastic injection-molded part. Reference symbol 303 denotes the guide pin 303 of the injector device support 303 which engages in the positioning and centering hole 105.

The invention claimed is:

1. A device in combination with a capsule containing extraction material or an extract, said device being configured to discharge an extraction product from the capsule and comprising:
    a supporting surface for the capsule,
    at least one perforation element which projects from the supporting surface and comprises a perforation edge, and,
    at least one retaining web that projects from the supporting surface, and comprises a non-cutting edge and prevents a wall of the capsule from bearing against the supporting surface in an area surrounding the retaining web by the wall of the capsule bearing against said non-cutting edge
    wherein the supporting surface is defined by a sieve support, which is flat at least in sections and has at least one passage opening, and a sieve element, which is mounted flat on the sieve support and covers the passage opening, wherein an extraction product is capable of being discharged from the capsule through said sieve element, the said extraction product emerging from the capsule through an opening that is produced by the at least one perforation element; the retaining web is arranged in relation to a perforation edge of the perforation element such that the retaining web prevents a wall of the capsule from bearing against the supporting surface in an area surrounding the perforation edge, and
    wherein the retaining web butts against a perforation edge part that forms the perforation edge or is integrally formed with said perforation edge part, and wherein the retaining web is offset with regard to a perforation direction in comparison to the perforation edge.

2. A device according to claim 1, wherein the perforations in the sieve element comprise a diameter of between 0.1 mm and 0.3 mm.

3. A device according to claim 1, wherein the retaining web is designed to run parallel to a perforation direction.

4. A device according to claim 3, wherein the retaining web protrudes from the supporting surface by a height that, measured perpendicular to the support surface, decreases as a distance from a perforating edge of the perforation element increases.

5. A device in combination with a capsule containing extraction material or an extract, said device being configured to discharge an extraction product from the capsule and comprising:
    a supporting surface for the capsule,
    at least one perforation element that projects from the supporting surface and comprises a perforation edge for perforating the capsule, and,
    at least one retaining web that projects from the supporting surface, and comprises a non-cutting edge and prevents a wall of the capsule from bearing against the supporting surface in an area surrounding the retaining web by the wall of the capsule bearing against said non-cutting edge,
    wherein the supporting surface is defined by a sieve support, which is flat at least in sections and has at least one passage opening, and a sieve element, which is mounted flat on the sieve support and covers the passage opening, wherein an extraction product is capable of being discharged from the capsule through said sieve element, the said extraction product emerging from the capsule through an opening that is produced by the at least one perforation element; and
    wherein the retaining web is integrally formed on a support to which the sieve support is fastened, and wherein the retaining web extends through the sieve support and projects from the supporting surface.

6. A device according to claim 1, wherein the perforation element comprises the form of a metal sheet protruding from the supporting surface, and wherein the metal sheet is bent or composed of a plurality of sheet metal pieces that are positioned at an angle relative to one another.

7. A device for puncturing a capsule, which capsule comprises an extraction material for brewing a beverage, by perforating a wall of the capsule, the device comprising:
    a plate-like base element that forms a supporting surface for the capsule, the plate-like base element comprising a plurality of through openings for a liquid to flow through the plate-like base element into the capsule or from the capsule, said plate-like base element including a main portion that includes said supporting surface and extending portions that extend outwardly from peripheral edges of said supporting surface whereby peripheral edges of said main portion are defined by the peripheral edges of the supporting surface and peripheral edges of said extending portions, and
    wherein the extending portions are folded at an angle so as to project away from the supporting surface and thereby form a plurality of perforation elements that are integral with the plate-like base element and project from the peripheral edges of the supporting surface such that the peripheral edges of the main portion are defined solely by the peripheral edges of the supporting surface,
    the perforation elements each comprising a sharpened perforation edge projecting away from the supporting surface.

8. The device according to claim 7, wherein the extending portions are folded so that the perforation elements are at an angle of between 80° and 90° to the supporting surface.

9. The device according to claim 7, wherein the perforation elements are approximately perpendicular to the supporting surface.

10. The device according to claim 7, wherein the supporting surface is essentially rectangular in shape and has four corners, and wherein one of the perforation elements is disposed adjacent to each corner of the supporting surface.

11. The device according to claim 7, wherein a number of the through openings corresponds to a number of the perforation elements.

12. The device according to claim 7, wherein each perforation element comprises a piercing tip.

13. The device according to claim 7, wherein the plate-like base element integral with the perforation elements is made of a sheet metal.

14. The device according to claim 7, wherein the perforation edges are at an angle to the supporting surface.

15. In a combination of an extraction apparatus with a capsule, the capsule comprising an extraction material for brewing a beverage by means of the extraction apparatus by perforating a wall of the capsule, injecting a liquid into the capsule and discharging a resulting extraction product as a beverage, a device for perforating the wall of the capsule, the device comprising:
- a plate-like base element that forms a supporting surface for the capsule, the plate-like base element comprising a plurality of through openings for a liquid to flow through the plate-like base element into the capsule or from the capsule, said plate-like base element including a main portion that includes said supporting surface and extending portions that extend outwardly from peripheral edges of said supporting surface whereby peripheral edges of said main portion are defined by the peripheral edges of the supporting surface and peripheral edges of said extending portions,
- wherein the extending portions are folded at an angle to project away from the supporting surface and thereby form a plurality of perforation elements that are integral with the plate-like base element and project from the peripheral edges of the supporting surface such that the peripheral edges of the main portion are defined solely by the peripheral edges of the supporting surface,
- the perforation elements each comprising a sharpened perforation edge projecting away from the supporting surface.

16. An extraction apparatus configured to prepare individual portions of a beverage from an extraction material that is packaged in a capsule, said extraction apparatus comprising a device for puncturing a capsule, which capsule comprises an extraction material for brewing a beverage, by perforating a wall of the capsule, the device comprising:
- a plate-like base element that forms a supporting surface for the capsule, the plate-like base element comprising a plurality of through openings for a liquid to flow through the plate-like base element into the capsule or from the capsule, said plate-like base element including a main portion that includes said supporting surface and extending portions that extend outwardly from peripheral edges of supporting surface whereby peripheral edges of said main portion are defined by the peripheral edges of the supporting surface and peripheral edges of said extending portions, and
- wherein the extending portions are folded at an angle to project away from the supporting surface and thereby form a plurality of perforation elements that are integral with the plate-like base element and project from the peripheral edges of supporting surface such that the peripheral edges of the main portion are defined solely by the peripheral edges of the support surface,
- the perforation elements each comprising a sharpened perforation edge projecting away from the supporting surface.

* * * * *